Patented Nov. 5, 1940

2,220,692

UNITED STATES PATENT OFFICE 2,220,692

PROCESS OF MAKING AMMONIUM MANDELATE

Donalee L. Tabern, Lake Bluff, and Edmond E. Moore, Hugh D. Robinson, and Robert S. Frye, Waukegan, and James E. Rundell, North Chicago, Ill., assignors to Abbott Laboratories, North Chicago, Ill., a corporation of Illinois No Drawing. Application February 12, 1937, Serial No. 125,432

1 Claim. (Cl. 260—520)

The present invention relates to urinary antiseptics and more in particular to stable ammonium and open chain alkyl substituted ammonium salts of mandelic acid possessing characteristics making them particularly adaptable for use as urinary antiseptics.

It has recently been discovered that mandelic acid is of great practical value as a urinary antiseptic and that to achieve the desired antiseptic activity it is also essential to maintain the urine in an acid condition preferably below a pH value of 5.5. As the mandelic acid itself has been found to be poorly tolerated by the human stomach, it is necessary to administer the acid in stable salt form. However, the use of stable alkali salts of mandelic acid, e. g. sodium mandelate, without the simultaneous administration of an acidifying salt such as ammonium chloride, have been found unsatisfactory as they do not tend to acidify the urine and thus prevent effective antiseptic action.

It has still more recently been discovered that the ammonium salt of mandelic acid may be used to advantage as a urinary antiseptic as it affords both the desired antiseptic effect and the essential acidification. Previous attempts, however, to prepare ammonium mandelate in a suitable stable solid form have heretofore been unsuccessful. For example, Wickler in Ann. 18,317 (1836) states that the ammonium salt "* * * forms a yellowish white soft mass * * *"; McMaster in Jour. Am. Chem. Soc. 1914, vol. 36, page 1924, states "The salt, being very deliquescent in the air * * . * * * It loses ammonia in moist air."; Lancet in April 14, 1936, page 770 states "* * * ammonium mandelate being hygroscopic cannot be supplied in tablet form * * *"; and Fantus and Sisson in the Journal of the American Pharmaceutical Association of December, 1936, at page 1138, referring to ammonium mandelate, state, "As this salt is hygroscopic it is desirable that it be prepared extemporaneously."

The unsuccessful attempts to provide a suitable stable non-hygroscopic solid ammonium mandelate has necessitated is administration in solution. Unfortunately, the use of the product in this manner has been found unsatisfactory due to the fact that elixirs containing ammonium mandelate are intensely bitter, unpleasant and frequently nauseating in taste. Researchers in the pharmacological field recognizing the many variabilities in individual human systems have long sought a stable compound or salt of mandelic acid suitable for use in tablet or capsule form that would provide both consistent antiseptic and acidifying effects.

It is, therefore, the principal object of our invention to provide stable non-hygroscopic ammonium and open chain alkyl substituted ammonium salts of mandelic acid possessing characteristics which make them particularly adapted for use as urinary antiseptics.

It is another object of our invention to provide stable salts of mandelic acid which are of constant potency and are readily tolerated by the human stomach.

It is still another object of our invention to provide free-flowing salts of mandelic acid that are easily handled and are suitable for use in tablet or capsule form.

It is a further object of our invention to provide a process for preparing substantially pure ammonium and open chain alkyl substituted ammonium salts of mandelic acid which are stable, non-hygroscopic, white, crystalline solids.

Other objects will be apparent as the description hereinafter proceeds.

We have discovered a process for preparing substantially pure ammonium or open chain alkyl substituted ammonium mandelate salts which possess novel and unexpected properties not present in ammonium mandelate salts heretofore prepared. For example, our products are stable, non-hygroscopic, white, crystalline solids that may be kept in a humid atmosphere for considerable periods of time without deterioration. In addition, and of great importance in the manufacture of pharmaceuticals, our non-hygroscopic products are easily handled. Our products, for example, flow freely in tablet or capsule machines and may be compressed in the usual manner into stable tablets or filled into capsules which may in turn be coated or left uncoated as desired. Although our invention is not limited by theoretical explanations, we believe past attempts to prepare stable non-hygroscopic ammonium salts of mandelic acid have been unsuccessful primarily due to the presence of impurities including water during the preparation of salts, and, in addition, to the use of high temperatures in the process and in the vacuum drying.

The following examples will serve to illustrate the preparation of stable, non-hygroscopic, white, crystalline salts of mandelic acid in accordance with our invention.

*Example I*

About 500 grams of anhydrous benzene is treated with dry gaseous ammonia and while the stream of gas is passing into the benzene about 200 grams of dry solid mandelic acid preferably of about 30 mesh is added. The mandelic acid is added slowly at first and then more rapidly with stirring to facilitate the absorption of the gas. The passage of the ammonia gas into the benzene-mandelic acid mixture is continued until the readily filtered crystalline solid yields a neutral or slightly alkaline solution in water. The mixture is then rapidly filtered and the precipitate (ammonium mandelate) washed thoroughly with a low boiling, non-hygroscopic solvent such as petroleum ether preferably saturated with ammonia. The washed precipitate is then cautiously dried in vacuo at a temperature not over 60° C. and preferably at room temperature. The product, which is a white, crystalline solid, is stable and non-hygroscopic. Nitrogen analysis proves the material to be the pure ammonium salt. This material exposed for several weeks to air 60 percent saturated with moisture remains granular.

Example II

About 15.2 grams of dry mandelic acid is slowly added to a mixture containing about 50 c. c. of anhydrous benzene and 7.3 grams of dry diethylamine. The mixture is then thoroughly stirred or shaken and there is formed almost immediately a beautiful crystalline precipitate of diethylammonium mandelate. The salt is next washed with a low boiling solvent, preferably isopentane, and carefully dried without heat, as described in Example I. The product is substantially pure diethylammonium mandelate. This salt is also non-hygroscopic and may be kept in the open air without deterioration.

In a similar manner other stable, non-hygroscopic, open chain alkyl substituted ammonium salts of mandelic acid may be prepared, including for example salts of methyl, propyl, and butyl amines, and ethylene diamine. All of the mandelic acid salts, including the ammonium salt, and the open chain alkyl substituted ammonium salts prepared in accordance with our invention are substantially pure, stable, non-hygroscopic, crystalline solids of constant potency. In addition, all of the compounds are easily handled and may be readily used in tablet and capsule form.

It will be understood by those skilled in the art that in place of the benzene used in the above examples, other inert, anhydrous, organic solvents, such as dry ether, purified acetone, etc., may be employed. Anhydrous aliphatic hydrocarbon solvents may also be used if desired, although they ordinarily give a slower absorption of the ammonia gas. In addition, certain anhydrous alcohols such as butyl alcohol and the like may be employed as a dispersing medium if at the conclusion of the reaction all of the alcohol is completely removed by washing or soaking with a non-hygroscopic solvent such as benzene or pentane.

It will also be understood by those skilled in the art that while we have illustrated our invention with specific examples, our invention is not limited thereto. All modifications coming within the spirit and scope of our invention are intended to be covered by the claim appended hereto.

We claim:

The process of making stable, free-flowing, non-hygroscopic, white, crystalline salts of mandelic acid, which comprises treating dry mandelic acid dispersed in an anhydrous, inert organic solvent with a compound selected from the group consisting of dry ammonia and dry open chain lower alkyl substituted ammonia, washing the resulting precipitate with an inert organic, non-hygroscopic solvent, and drying the washed precipitate in vacuum at a temperature below 60° C.

DONALEE L. TABERN.
EDMOND E. MOORE.
HUGH D. ROBINSON.
ROBERT S. FRYE.
JAMES E. RUNDELL.